US012701302B2

(12) United States Patent
Turnbull et al.

(10) Patent No.: US 12,701,302 B2
(45) Date of Patent: Aug. 4, 2026

(54) MULTICAST ASSISTED DELIVERY

(71) Applicant: BRITISH TELECOMMUNICATIONS PUBLIC LIMITED COMPANY, London (GB)

(72) Inventors: Rory Turnbull, London (GB); Stephen Appleby, London (GB); Timothy Stevens, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 567 days.

(21) Appl. No.: 17/433,738

(22) PCT Filed: Feb. 26, 2020

(86) PCT No.: PCT/EP2020/054993
§ 371 (c)(1),
(2) Date: Aug. 25, 2021

(87) PCT Pub. No.: WO2020/173984
PCT Pub. Date: Sep. 3, 2020

(65) Prior Publication Data
US 2022/0141543 A1 May 5, 2022

(30) Foreign Application Priority Data
Feb. 27, 2019 (EP) ..................................... 19159748

(51) Int. Cl.
*H04N 21/6405* (2011.01)
*H04N 21/2183* (2011.01)
(Continued)

(52) U.S. Cl.
CPC ..... *H04N 21/6405* (2013.01); *H04N 21/2183* (2013.01); *H04N 21/222* (2013.01);
(Continued)

(58) Field of Classification Search
CPC .......... H04N 21/6405; H04N 21/2183; H04N 21/222; H04N 21/26616; H04N 21/6408; H04N 21/64322; H04N 21/8456
(Continued)

(56) References Cited

U.S. PATENT DOCUMENTS 6,343,323 B1 * 1/2002 Kalpio ................. G06Q 20/102
705/40
6,574,795 B1 6/2003 Carr
(Continued)

FOREIGN PATENT DOCUMENTS

CN 103004133 3/2013
CN 106464932 2/2017
(Continued)

OTHER PUBLICATIONS

Combined Search and Examination Report dated Dec. 21, 2020 issued in GB Application No. GB2012951.6 (6 pages).
(Continued)

*Primary Examiner* — Ngoc K Vu
(74) *Attorney, Agent, or Firm* — Nixon & Vanderhye P.C.

(57) ABSTRACT

Described is a method of delivering content over network using an approach referred to here as "Multicast Assisted Unicast Delivery" (MAUD), as a multicast network is used to assist, rather than substituting for, an otherwise unicast path. Content is requested by client devices from a content server over unicast. These unicast requests are sent via a first and a second proxy, before being sent by the second proxy to the content server, all over unicast. The responses containing the requested content is sent back to the second proxy over unicast from the content server. The second proxy processes the received unicast responses and sends the responses over a multicast stream to the first proxy. The first
(Continued)

proxy processes the received responses and sends them onto the requesting client devices over unicast.

20 Claims, 11 Drawing Sheets

(51) Int. Cl.

| | |
|---|---|
| *H04N 21/222* | (2011.01) |
| *H04N 21/266* | (2011.01) |
| *H04N 21/6408* | (2011.01) |
| *H04N 21/643* | (2011.01) |
| *H04N 21/845* | (2011.01) |

(52) U.S. Cl.
CPC ... *H04N 21/26616* (2013.01); *H04N 21/6408* (2013.01); *H04N 21/64322* (2013.01); *H04N 21/8456* (2013.01)

(58) Field of Classification Search
USPC ........................................................ 709/231
See application file for complete search history.

(56) References Cited

U.S. PATENT DOCUMENTS

| | | | |
|---|---|---|---|
| 6,973,667 B2 | 12/2005 | Fritsch | |
| 7,404,201 B2 | 7/2008 | Takeuchi | |
| 8,713,195 B2 | 4/2014 | Pickens | |
| 9,059,916 B2 | 6/2015 | Hwang | |
| 9,380,091 B2 | 6/2016 | Bao | |
| 9,673,996 B1* | 6/2017 | Upadhyay | H04L 65/61 |
| 9,871,666 B2 | 1/2018 | Hennig | |
| 10,129,855 B1 | 11/2018 | Naim et al. | |
| 10,257,077 B1* | 4/2019 | Zhu | H04L 12/1877 |
| 10,412,343 B2 | 9/2019 | Kwan | |
| 10,972,761 B2 | 4/2021 | Ra | |
| 2002/0118689 A1 | 8/2002 | Luijten | |
| 2002/0124262 A1 | 9/2002 | Basso | |
| 2004/0078624 A1 | 4/2004 | Maxemchuk | |
| 2006/0059133 A1* | 3/2006 | Moritani | G06F 16/951 |
| | | | 709/224 |
| 2006/0143669 A1 | 6/2006 | Cohen | |
| 2007/0107026 A1 | 5/2007 | Sherer | |
| 2010/0043022 A1 | 2/2010 | Kaftan | |
| 2011/0131298 A1* | 6/2011 | Courtemanche | H04L 67/1095 |
| | | | 709/219 |
| 2011/0239262 A1 | 9/2011 | Yang | |
| 2012/0072901 A1 | 3/2012 | Hessenauer et al. | |
| 2012/0170578 A1 | 7/2012 | Anumala et al. | |
| 2012/0259994 A1 | 10/2012 | Gillies | |
| 2013/0114597 A1* | 5/2013 | Ogisawa | H04L 65/611 |
| | | | 370/390 |
| 2013/0124683 A1 | 5/2013 | Watanabe et al. | |
| 2013/0250803 A1* | 9/2013 | Abraham | H04L 41/5058 |
| | | | 370/254 |
| 2014/0282777 A1 | 9/2014 | Gonder | |
| 2014/0359672 A1* | 12/2014 | Lin | H04N 21/44209 |
| | | | 725/62 |
| 2014/0380395 A1* | 12/2014 | Desmauts | H04N 21/64738 |
| | | | 725/116 |
| 2015/0207838 A1 | 7/2015 | Gabin et al. | |
| 2016/0191651 A1* | 6/2016 | Balakrishnan | H04L 67/5683 |
| | | | 709/219 |
| 2016/0269794 A1* | 9/2016 | Shimura | H04N 21/4316 |
| 2016/0323348 A1 | 11/2016 | Bradbury et al. | |
| 2016/0380890 A1 | 12/2016 | Hennig et al. | |
| 2017/0063684 A1* | 3/2017 | Stokking | H04L 65/765 |
| 2017/0118263 A1* | 4/2017 | Crabtree | H04N 21/23439 |
| 2017/0127147 A1 | 5/2017 | Crabtree et al. | |
| 2017/0237824 A1* | 8/2017 | Vignali | H04L 67/02 |
| | | | 709/203 |
| 2018/0063705 A1* | 3/2018 | Maslak | H04W 72/29 |
| 2018/0343291 A1 | 11/2018 | Lohmar et al. | |
| 2019/0191212 A1 | 6/2019 | Sljivic et al. | |
| 2020/0005254 A1* | 1/2020 | Wright | H04L 9/0838 |
| 2022/0141542 A1 | 5/2022 | Stevens et al. | |
| 2022/0141543 A1 | 5/2022 | Turnbull et al. | |

FOREIGN PATENT DOCUMENTS

| | | |
|---|---|---|
| CN | 107257268 | 10/2017 |
| EP | 1 398 938 | 3/2004 |
| EP | 2 597 824 | 5/2013 |
| EP | 2 695 326 | 2/2014 |
| EP | 3 127 334 | 2/2017 |
| GB | 2583020 | 10/2020 |
| JP | 2018-129599 | 8/2018 |
| WO | 2012/138909 | 10/2012 |
| WO | 2016/107733 | 7/2016 |
| WO | 2018/073317 | 4/2018 |
| WO | 2018/097827 | 5/2018 |
| WO | 2020/173878 | 9/2020 |
| WO | 2020/173984 | 9/2020 |
| WO | 2022/037972 A1 | 2/2022 |

OTHER PUBLICATIONS

Cabellabs, IP Multicast Adaptive Bit Rate Architecture Technical Report, V01 Oct. 26, 2016, Document Control No. OC-TR-IP-MULTI-ARCH-C01-161026 (69 pages).
3GPP TS 23.246 V16.1.0 (Sep. 2019) Multimedia Broadcast/Multicast Service (MBMS); Architecture and functional description (Release 16); 2019 (77 pages).
Adaptive media streaming over IP multicast DVB Document A176 (Second edition) Mar. 2020 (110 pages).
International Preliminary Report on Patentability dated Aug. 25, 2021 issued for PCT/EP2020/054993 (8 pages).
International Preliminary Report on Patentability dated Aug. 25, 2021 issued for PCT/EP2020/054777 (8 pages).
International Search Report and Written Opinion of the ISA for PCT/EP2020/054993 dated May 12, 2020, 12 pages.
International Search Report for PCT/EP2020/054777 dated May 12, 2020, 3 pages.
Written Opinion of the ISA for PCT/EP2020/054777 dated May 12, 2020, 6 pages.
Extended European Search Report for EP Application No. 19159748.3 dated Apr. 9, 2019, 8 pages.
Combined Search and Examination Report for GB Application No. 1902640.0 dated Aug. 16, 2019, 6 pages.
Search Report for GB Application No. 2002565.6 dated Jul. 13, 2020, 5 pages.
U.S. Appl. No. 17/433,414 to Stevens, et al., filed Aug. 24, 2021, entitled "Multicast Assisted Delivery", 31 pages.
International Search Report and Written Opinion dated Nov. 2, 2021 issued for PCT/EP2021/071994 (14 pages).
Csaba Okrona: "What Is a HTTP HEADRequest Good for? Some Uses", Aug. 27, 2011 (Aug. 27, 2011), XP055139472,Retrieved from the Internet:URL:https://ochronus.com/http-head-request-good-uses/[retrieved on Sep. 10, 2014]the whole document (3 pages).
Office Action dated Aug. 18, 2022, issued for U.S. Appl. No. 17/433,414 (13 pages).
Office Action dated Dec. 26, 2022, issued for Chinese Application No. 202080016552.5 (9 pages).
Office Action dated Dec. 2, 2022, issued for Chinese Application No. 202080016920.6 (12 pages).
Office Action dated Mar. 28, 2023 issued for U.S. Appl. No. 17/433,414 (18 pages).
Office Action dated Jul. 27, 2023 issued for Chinese Application No. 202080016552.5 (5 pages).
Communication pursuant to Article 94(3) EPC dated Feb. 17, 2025 issued for European Application No. 20 705 761.3-1207 (6 pages).
Communication pursuant to Article 94(3) EPC dated Feb. 18, 2025 issued for European Application No. 20 705 231.7-1207 (6 pages).

* cited by examiner

MULTICAST ASSISTED DELIVERY

This application is the U.S. national phase of International Application No. PCT/EP2020/054993 filed Feb. 26, 2020 which designated the U.S. and claims priority to EP Patent Application No. 19159748.3 filed Feb. 27, 2019, the entire contents of each of which are hereby incorporated by reference.

FIELD OF THE INVENTION

This invention relates to the field of content delivery using a combination of unicast and multicast.

BACKGROUND TO THE INVENTION

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed 15$^{th}$ June) without football, and plot 104 shows the traffic volumes the following day (Thu 16$^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such request/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-001-161026, 26 Oct. 2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8th March 2018).

FIG. 2 shows a generalised example of such hybrid solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as a client, and independently makes requests for content segments and dispatches the entire response into the multicast network. Proxy X does this by first requesting a manifest file and then making timely requests for the content segments described within it. In some cases, the content server may require client devices to authenticate themselves with valid credentials before content is served. This is done by supplying Proxy X with valid credentials to be able to access content from content server 202. Thus, authentication is done using credentials configured at Proxy X 206 and not any credentials provided by the individual client devices. Proxy X 206 effectively acts like a pseudo-client.

Thus, Proxy X behaves as a client, requesting content from the content server and pushing the responses over multicast to the Proxy Ys. The client devices will request content from the Proxy Ys independently of the requests being made by Proxy X to the content server. In other words, requests for content from the client devices to Proxy Y are not passed onto Proxy X, with Proxy X configured to make requests for that content on behalf of the client devices. This means there is a possible race condition, where the client devices request media segments via Proxy Y before Proxy X has requested and pushed the these back to Proxy Y, which may result in some content being delivered twice to Proxy Y (once over unicast and once over multicast). This can be solved either by delaying the response from Proxy Y until the relevant segment arrives, or manipulating the manifests returned to the client devices to ensure that the Proxy X is able to request and push content before the client devices make their requests. Neither solution is optimal.

Furthermore, Proxy X requests content from the content server based purely on information contained in the manifest file. A manifest file will contain information about the segment durations, and Proxy X will use this to make requests at the desired rate. The client devices will operate similarly, although the timing of segment requests will be determined by the fullness of the client buffer, which fills as segments data is received and emptied as the video is decoded and rendered. However, there is a possibility that segment durations published in the manifest file may not exactly match the actual durations. This will cause a mismatch between the segment request interval by Proxy X and the segment request interval by the client device. This may result in buffer underflow of the client buffer which, will cause video playback to stall.

The content server is typically a CDN edge cache, and under normal operation, the CDN provider would have visibility of the number of requests being made and the number of responses it is serving. This information is used for service monitoring, metering and analytics, and is often crucial to the CDN operator's business (e.g. for service assurance and billing, etc.) With the hybrid architectures outlined above, regardless of the number of client devices consuming content, there is only a single request made by the Proxy X and a corresponding single response. This clearly has an impact on established CDN operations such as those described here.

SUMMARY OF THE INVENTION

It is the aim of examples of the present invention to provide an improved method of content delivery.

According to one example of the invention, there is provided a method of delivering content to a client device in a network comprising a plurality of client devices, said method comprising:

i) receiving at a first network node a request for content from one of the client devices over unicast, and sending that request to a second network node over unicast;

ii) receiving the request for content at a second network node from the first network node, and then sending a corresponding request onto the content server over unicast;

iii) receiving the requested content at the second network node from the content server over unicast, and in response sending the received content to the first network node over multicast;

iv) receiving the content from the second network node at the first network node, and sending the content to the requesting client device over unicast.

The request from one of the client devices may be a HTTP GET request. The corresponding request sent by the second network node may be a HTTP GET request. Alternatively, the corresponding request may be a HTTP HEAD request.

The content received at the second network node may be cached there. Further, the cached content may be provided to other client devices requesting that content.

The requested content received at the second node may be reformatted and pushed over multicast to the first network node.

The content may be media content, and may further comprise a video sequence.

According to a further example of the present invention, there is provided a system for delivering content to a client device in a network comprising a plurality of client devices, said system comprising a first network node and a second network node, wherein the first network node is adapted to receive a request for content from one of the client devices over unicast, and to send that request to a second network node over unicast; the second network node is adapted to receive the request for content from the first network node, and to then send a corresponding request onto a content server over unicast;

the second network node is further adapted to receive the requested content at the second network node from the content server over unicast, and in response to send the received content to the first network node over multicast; and the first network node is further adapted to receive the content from the second network node, and to send the content to the requesting client device over unicast.

In examples of the invention, little modification is required to client devices or content servers, which can request content and respond to requests respectively in the usual manner.

In prior hybrid systems, the second proxy server (Proxy X) is required to be configured with details of the content service such that it can acquire a manifest file and behave in a similar way to clients, by processing the manifest file and making appropriate segment requests. In contrast, in examples of the present invention, the second proxy server does not need access to a manifest file and instead is driven synchronously by the leading client device requesting the segment. This solves the two earlier problems created by the client device and Proxy X operating asynchronously, which results in increase delay and buffer underflow.

In order for CDN operators to have visibility of all the segments requests, the second proxy server could pass on the segment requests as HEAD requests for all but the 1St segment request (which would be a GET request). This would enable the CDN operators to get the statistics they require but without needing to serve full responses.

As examples of the invention operate without knowledge of the manifest file, they would work in situations where the manifest file is obfuscated (e.g. YouTube), proprietary, encrypted or concealed in some other way. The examples operate at the media segment level, reducing the complexity of the second proxy server (Proxy X), thus making deployment more straightforward.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of delivering content over network using an approach referred to here as "Multicast Assisted Unicast Delivery" (MAUD), as a multicast network is used to assist, rather than substituting for, an otherwise unicast path. Content is requested by client devices from a content server over unicast. These unicast requests are sent via a first and a second proxy, before being sent by the second proxy to the content server, all over unicast. The responses containing the requested content is sent back to the second proxy over unicast from the content server. The second proxy processes the received unicast responses and sends the responses over a multicast stream to the first proxy. The first proxy processes the received responses and sends them onto the requesting client devices over unicast. The first proxy also caches the responses, and can send them to other client devices that subsequently request that content, without having to forward those requests to the content server.

The establishment of a multicast stream between the second proxy and first proxy is done once it has been identified that a certain number of client devices might request the same content. Thus, a single multicast stream can is used to carry content between the second proxy and first proxy before being sent to multiple client devices over unicast.

Figure 1:
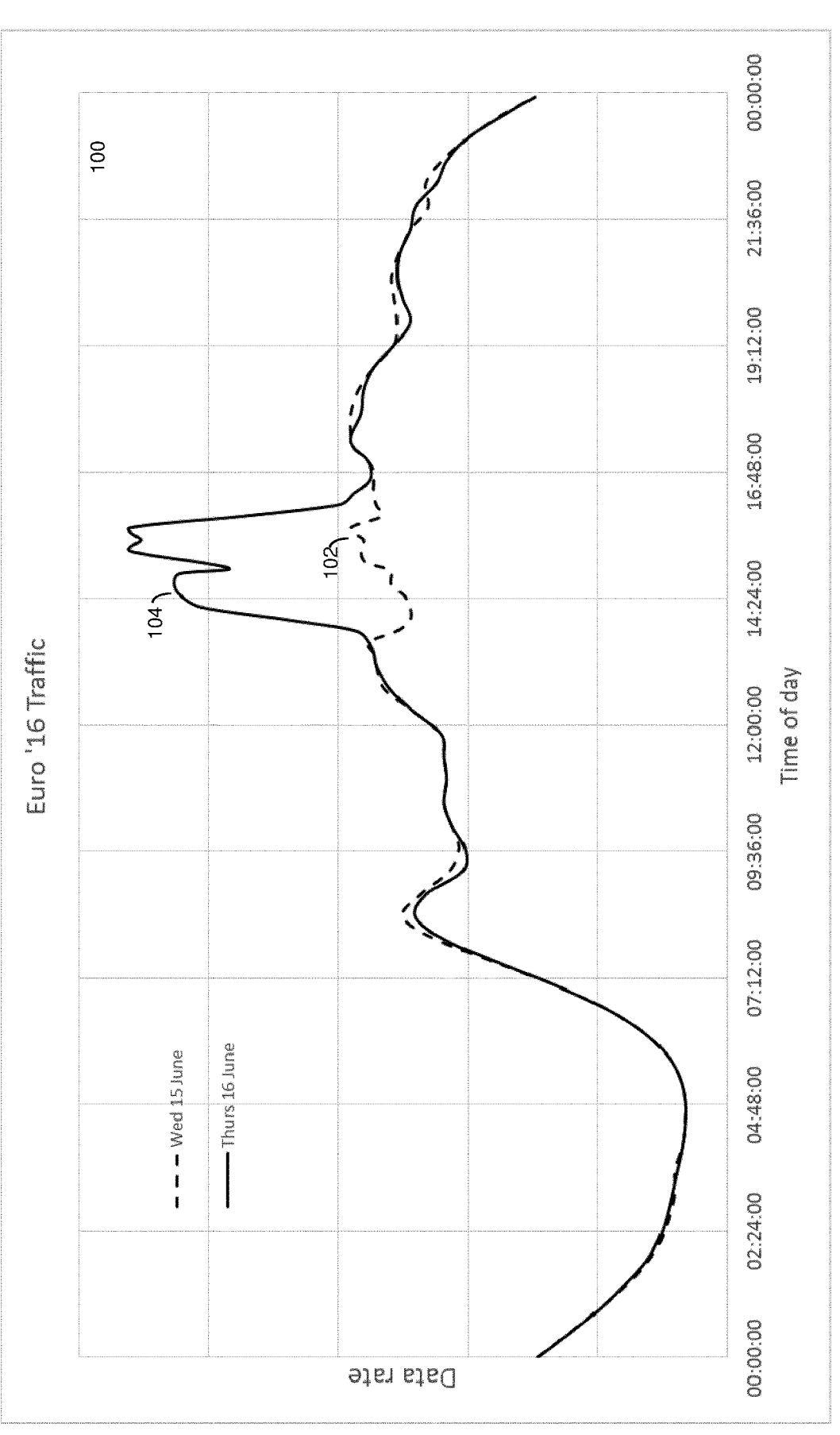
FIG. 1 is a graph showing traffic volume over a network on different days.
Figure 2:
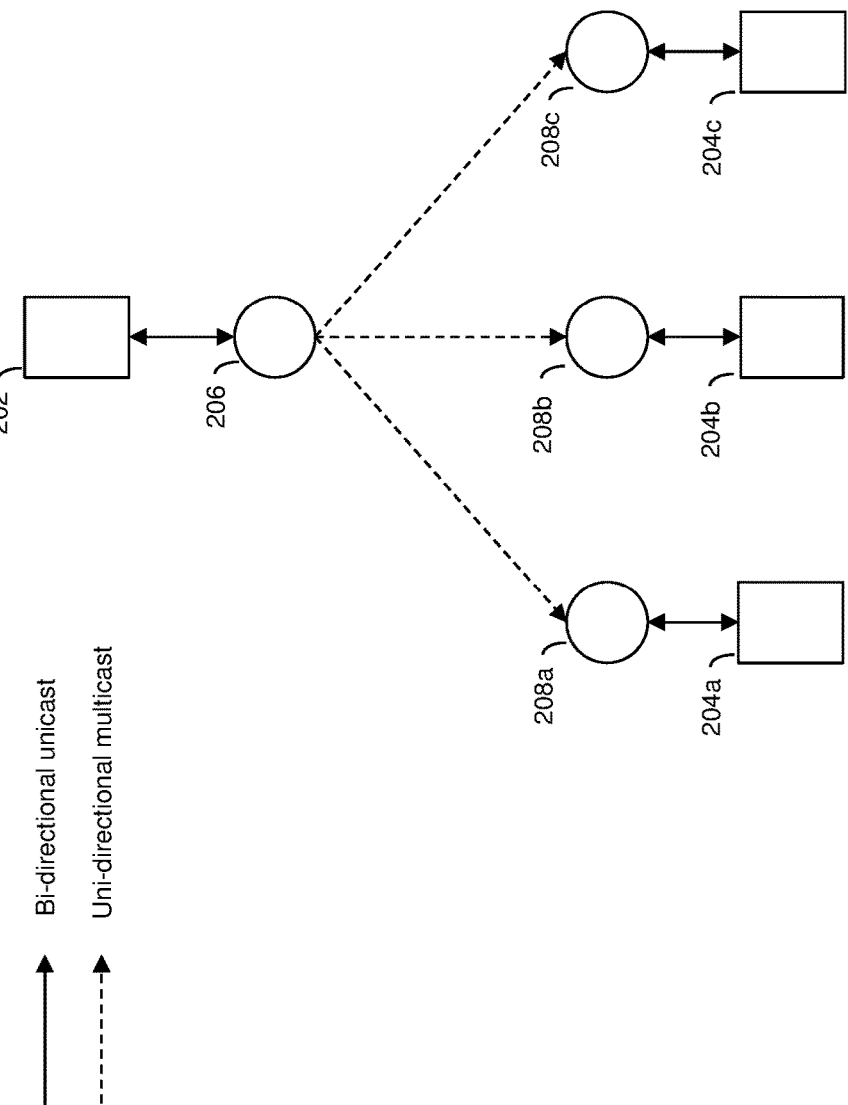
FIG. 2 is a network diagram of a general prior solutions.
Figure 3:
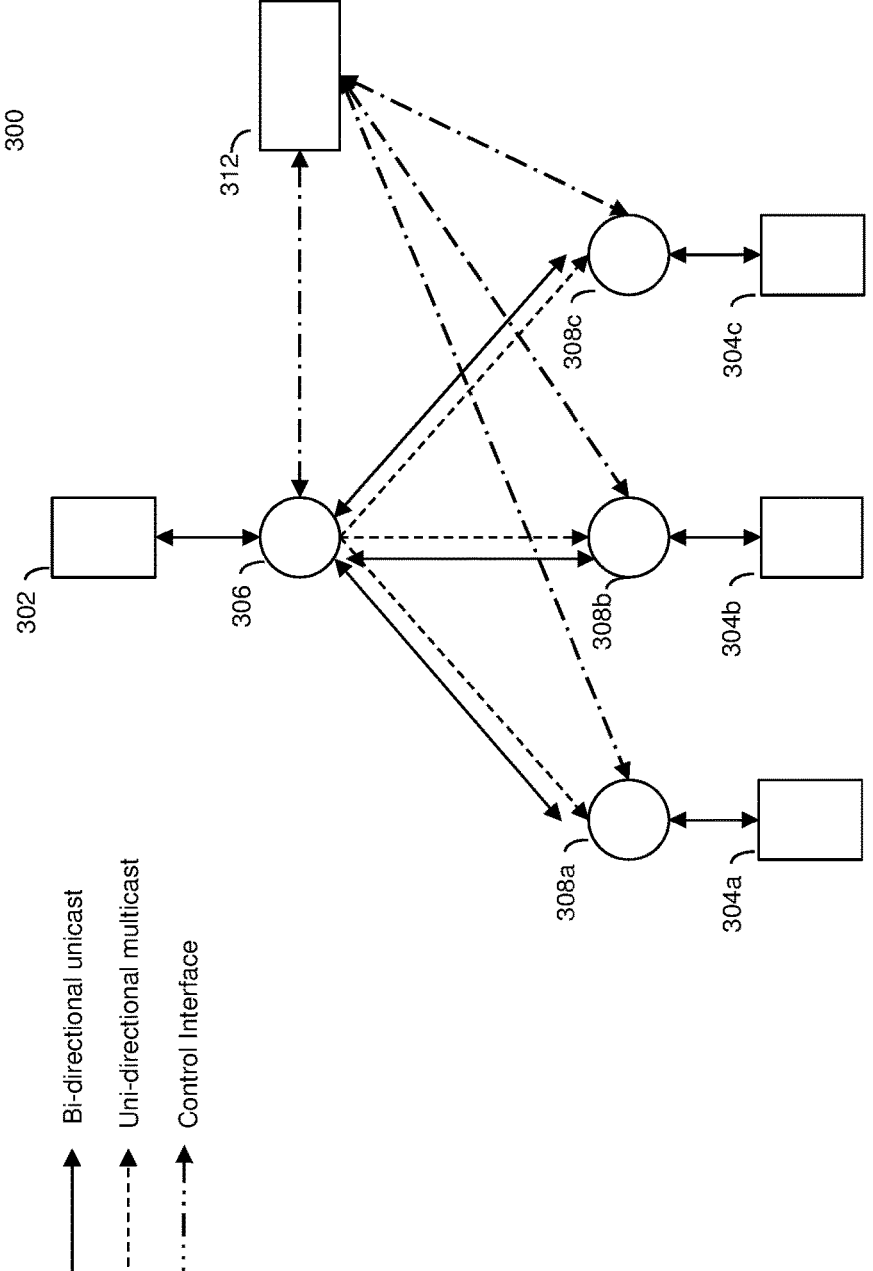
FIG. 3 is a network diagram showing the main components of an example of the present invention.

FIG. 3 shows the main components of a "Multicast Assisted Unicast Delivery" (MAUD) network. The network 300 comprises a content server 302, a Proxy X 306, Proxy Ys 308*a*, 308*b*, and 308*c*, client devices 304*a*, 304*b* and 304*c*, and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308*a*, 308*b*, and 308*c*, over both unicast and multicast. The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network.

The client devices are assumed to be running respective client applications, which are the source of content requests. For simplicity, the term client device from hereon in is used to refer to a client device running a client application. The client devices can make HTTP unicast requests for content held at the content server 302. The mechanism for delivery of that content is set out in examples of the present invention, where a multicast assisted unicast delivery (MAUD) approach is described.

The multicast controller 312 (MCC) monitors the operation of Proxy X and the Proxy Ys to determine which traffic should use multicast assistance (MAUD), and controls the proxies accordingly. Thus, in examples of the invention, the client devices may receive some traffic from the content server 302 directly over unicast, and other traffic using MAUD.

Many HTTP requests made by the client devices for content will not make use of MAUD, and are sent directly to the content server.

Other requests for content from a client device that may benefit from MAUD are re-directed to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and proxy Y to exist in different domains, which would often be the case.

Other mechanisms to insert proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

Figure 4:
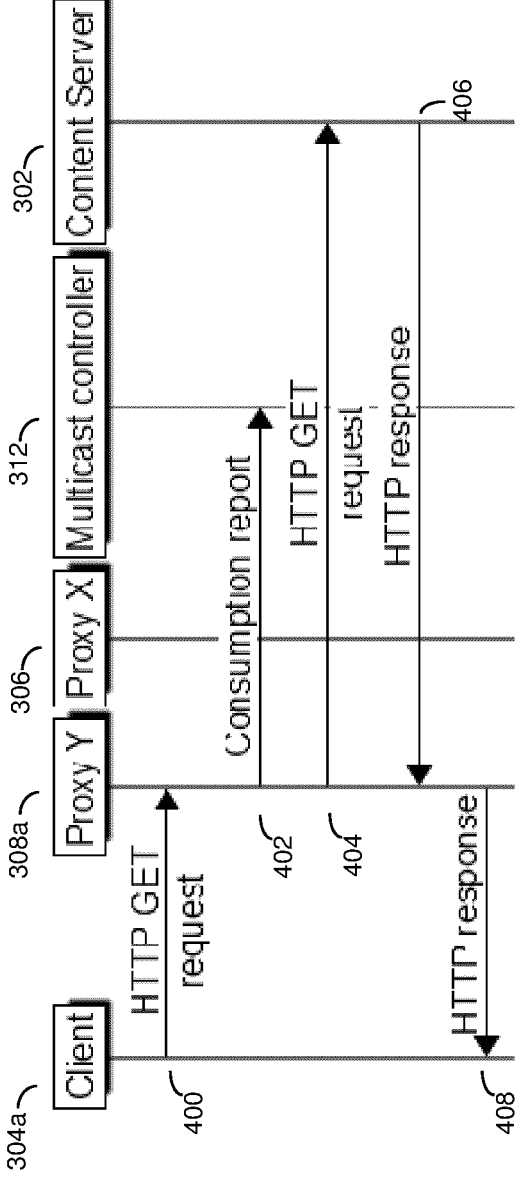
FIG. 4 is a message flow diagram for an initial process in an example of the present invention.

Reference is now made to FIG. 4, which shows a message flow diagram between client device 304*a*, Proxy Y 308*a*, Proxy X 306, multicast controller 312, and the content server 302, for the initial MAUD process.

In step 400, client device 304*a* makes an HTTP GET request for content. The request is received by Proxy Y 308*a*. Proxy Y 308*a* then sends a consumption report in step 402 to the multicast controller 312 over a control interface path (see dot-dashed line FIG. 3). The consumption report includes information on the HTTP request/response pairs being passed through the proxy e.g. the URL of the HTTP request.

Proxy Y 308*a* also forwards the HTTP GET request to the content server 302 in step 404. The content server 302 responds with an HTTP response containing the requested content. The response is received by Proxy Y 308*a* and sent to the client device 304*a*.

The content can then be viewed by the client device 304*a*.

Note, all the HTTP requests and responses thus far are unicast in nature.

Now, it should be further noted that requests for the same content might be made by other client devices. This is typical during for example a live football match. In such a situation the process of FIG. 4 will be repeated by a number of client devices and associated Proxy Ys, each sending consumption reports to the multicast controller 312 for their respective client devices.

The multicast controller 312 uses the received reports to decide whether the HTTP requests reported from a given population of Proxy Ys justifies the use of multicast for their responses. Such a population of Proxy Ys is referred to as a 'cohort'. Assuming certain conditions are satisfied (for example greater than a certain number of client devices requesting the same content), the multicast controller 312 will configure Proxy X and any relevant Proxy Ys (that is the cohort) for multicast assisted delivery.

Figure 5:
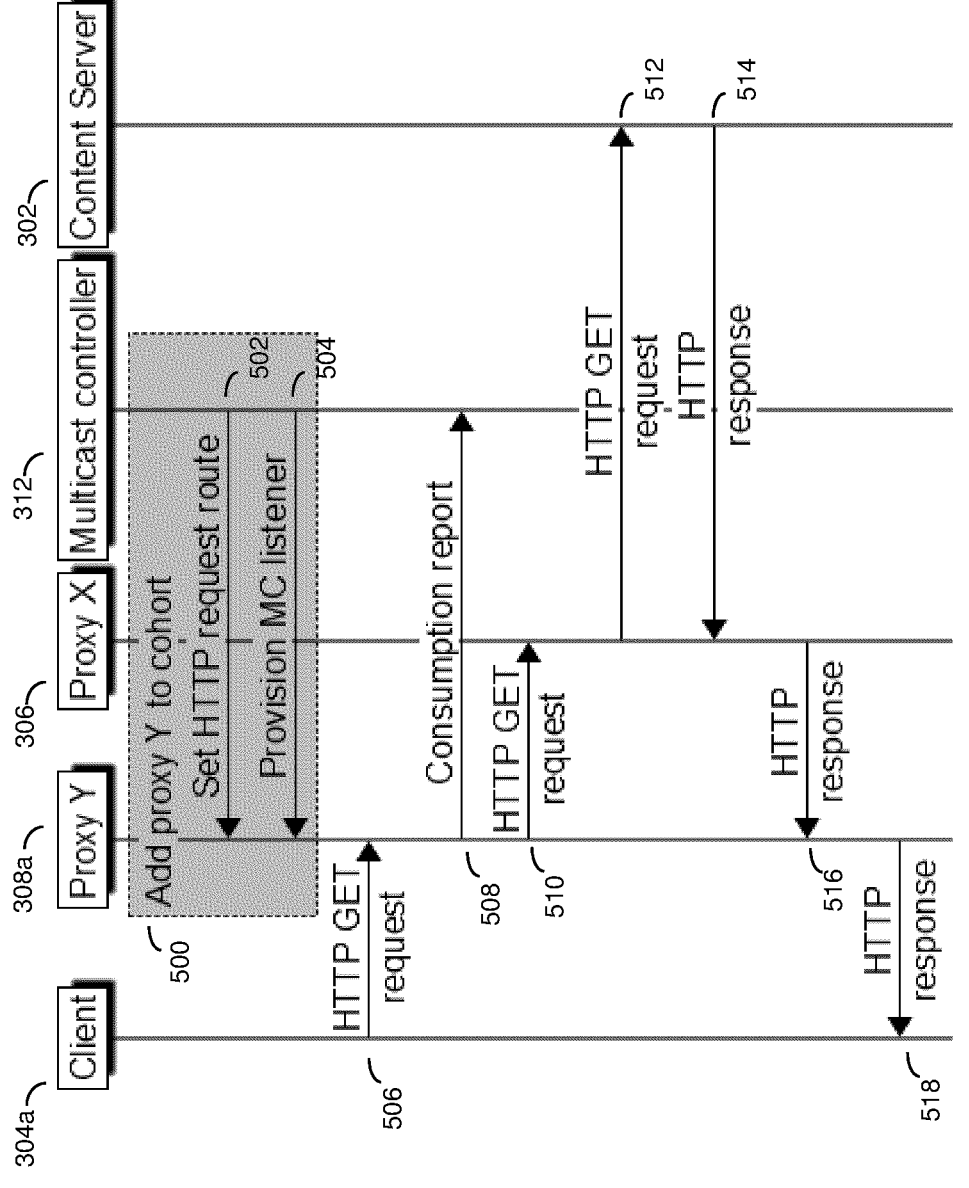
FIG. 5 is a message flow diagram for another part of the process in an example of the present invention.

FIG. 5 shows a message flow diagram of the process of adding a single Proxy Y 308*a* to a cohort for multicast assisted delivery, which initially takes place in step 500. Note in practice, there will be many client devices making requests and thus possibly many associated Proxy Ys that will follow this same logic and be added to the same cohort.

In step 500, Proxy Y 308*a* is added to a cohort by the multicast controller 312. The multicast controller 312 does so in step 502 by sending Proxy Y 308*a* instructions to set up an HTTP request route, whereby requests matching a particular URL path/pattern/string are directed to Proxy X 306.

For example, the multicast controller 312 might send "t2-btsport-live-hls-prod.akamaized.net" as a matching pattern to Proxy Y 308a. Then any requests for URLs originating from a client device that match that pattern will be redirected to Proxy X 306. The URL does not necessarily have to match in its entirety, but just have within it the matching pattern. For example, a client device may request a URL such as https://t2-btsport-live-hls-prod.akamaized-.net/out/u/bts1/bts1_7.m3u8 for a manifest, or https://t2-btsport-live-hls-prod.akamaized.net/out/u/bts1/bts1_7_15055280.ts?m=1543850508m=1543850508 for a video segment. Proxy Y 308a would forward these requests to Proxy X 306 as they have URLs that at least in part match the pattern specified by the multicast controller 312 in step 502.

Then in step 504, the multicast controller 312 also sends Proxy Y 308a instructions to provision a multicast listener. The instructions tell Proxy Y 308a to prepare to receive multicast, as Proxy X may choose to send some responses over multicast (for example, responses to the requests that Proxy Y has sent up to Proxy X, from the matching "t2-btsport-live-hls-prod.akamaized.net" pattern). The multicast listener causes Proxy Y to issue an IGMP join command to a multicast address specified by the multicast controller. Multicast may or may not arrive on this interface, depending on what Proxy X chooses to send (see discussion later on Proxy X set-up).

Note, steps 502 and 504 could be implemented as a single step: the multicast controller's instruction to Proxy Y to monitor for a matching pattern can also tell Proxy Y to provision a multicast listener.

Then in step 506 when the client device 304a next sends an HTTP GET request for content, the request is received by Proxy Y 308a, and Proxy Y 308a checks to see if it matches the match pattern set out in step 502. In this case it does. Proxy Y 308a can optionally send a consumption report (as in step 402) to the multicast controller 312 in step 508, as well as redirecting the HTTP GET request onto Proxy X 306 (instead of to the content server 302 directly) in step 510.

In step 512, Proxy X 306 sends the received HTTP GET request to the content server 302. In step 514, the content server 302 responds by sending the requested content in an HTTP response to Proxy X 306. In Step 516, Proxy X 306 forwards the response onto Proxy Y 308a. Then in step 518, the response is forwarded by Proxy Y 308a to the client device 304a.

The process described thus far shows how Proxy Y 308a is set-up to forward certain HTTP requests to Proxy X (step 502), and also to provision itself as a multicast listener (step 504) ready to receive multicast traffic. However, at this point there is no multicast traffic yet as Proxy X 306 has not yet been configured to send any multicast traffic. All the HTTP requests and responses so far are unicast in nature.

Figure 6:
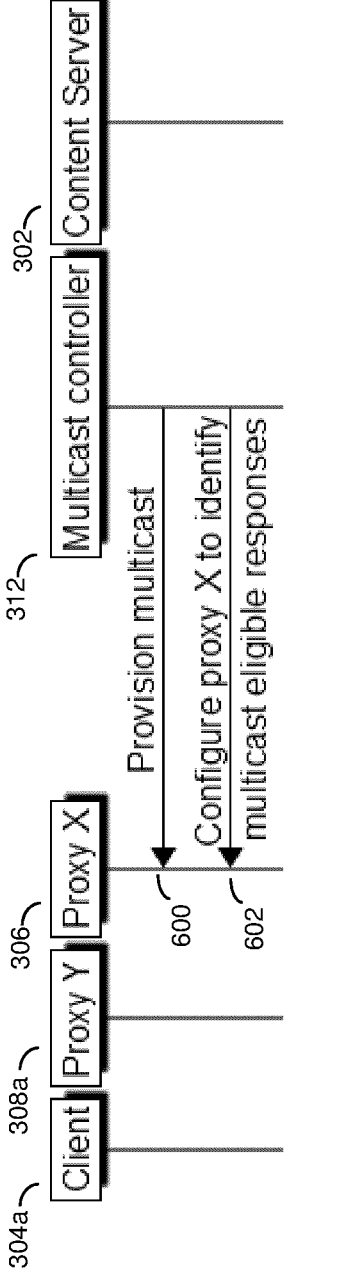
FIG. 6 is a message flow diagram showing how one of the proxies is established for multicast use in an example of the present invention.

Referring now to FIG. 6. To allow the Proxy X 306 to use multicast for the return path for responses to requests that meet the match pattern set out in step 502, the multicast controller 312 sends instructions to instruct Proxy X to use multicast for certain responses sent by the content server in step 600. In step 602, the multicast controller configures Proxy X to identify those responses by selecting on file or MIME type. For example, the instruction could be to only use multicast assistance for responses that contain video MIME types such as "video/mp4" or "video/MP2T". Other file types will be sent over unicast only. So in this example, text, manifests, images (all non-video MIME types), will be sent over unicast even if the corresponding requests meet the URL match pattern from step 502.

In an alternative example, responses can be selected based on specific Etags or a range of Etags. Etags (Entity Tags) are part of the HTTP 1.1 specification and are used to uniquely identify response payloads.

After this point, Proxy X and Proxy Y are enabled to deliver HTTP responses using multicast assisted unicast delivery, with the resulting possible communications paths shown in FIG. 3—note the combination of both unicast and multicast paths between Proxy X and the Proxy Ys, but only unicast paths between the client devices and the Proxy Ys and also between Proxy X and the content server.

After the steps of FIGS. 5 and 6 have been completed, the system is ready to provide multicast assistance to client devices making content requests that meet the predetermined match pattern (see step 502 above).

There now follows two examples of multicast assistance.

The first is a general approach where content requests are passed from a client device up to the content server over unicast, and a response passed back to the client device, but with the response carried over multicast over a portion of the return path. The second approach is where the response is further split into two components, one delivered over multicast and the other over unicast.

Figure 7:
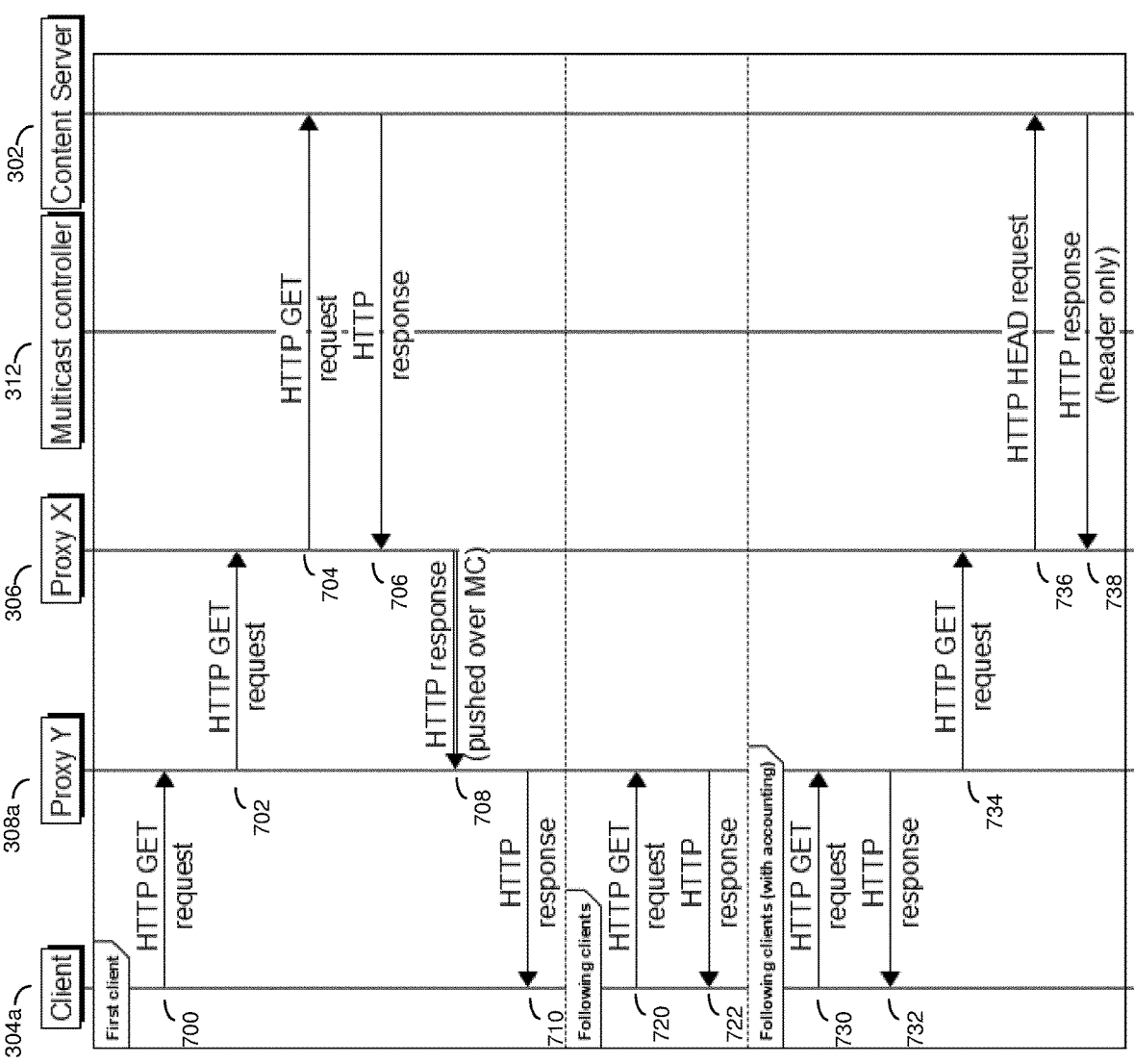
FIG. 7 is a message flow diagram showing content requests from client devices once multicast has been established between the two proxies in an example of the present invention.

The first general approach is illustrated in FIG. 7.

FIG. 7 shows a message flow diagram of client devices making requests for content that meet the predetermined match pattern (see step 502 above), and thus are handled with multicast assistance. FIG. 7 follows from FIGS. 4, 5, and 6, with both a cohort established, and Proxy X and Proxy Y configured to send and listen for multicast traffic respectively.

In FIG. 7, there is shown the message flow for a "first client" requesting a piece of content for the first time from the content server, followed by the message flow for another client requesting the same content some time later, and further the message flow for a client requesting the same content some time later (than the first client) but with an accounting/monitoring technique applied.

Starting with the first client, in step 700 the client 304a a sends an HTTP GET request for content over unicast to Proxy Y 308a. The request is received by Proxy Y 308a, and Proxy Y 308a checks to see if it matches the match pattern set out in step 502. In this case it does. Proxy Y 308a can optionally send a consumption report (not shown) to the multicast controller 312. Proxy Y 308a sends the HTTP GET request onto Proxy X 306 in step 702 over unicast. In step 704, Proxy X 306 sends the received HTTP GET request to the content server 302 over unicast.

In step 706, the content server 302 responds by sending the requested content in an HTTP response to Proxy X 306 over unicast.

In step 708, Proxy X 306 forwards the response onto Proxy Y 308a over multicast (assuming the response meets the content type criteria for multicast assistance as set up in FIG. 6). The response can be reformatted and pushed over multicast from Proxy X 306 to proxy Y using a suitable framing type such as QUIC, FLUTE, ROUTE, etc. In this example, QUIC packets are used, which are carried over multicast UDP and sent to Proxy Y.

The QUIC packets are received by Proxy Y 308a, where they are processed by Proxy Y 308a to extract the original HTTP response before sending it onto the client device 304a over unicast. Note, the HTTP response is also cached by Proxy Y 308*a* for serving to other client devices that request it as part of the established cohort.

Thus, when a following client device (a client device requesting the same content as requested in step 700, and also served by Proxy Y 308*a*) makes a request for the same content, Proxy Y 308*a* can respond to the request with the cached response without having to send the request up to the content server. This is illustrated in step 720 showing the HTTP GET request going to Proxy Y 308*a* and the HTTP response coming back from Proxy Y without any request being forwarded to Proxy X 306 or the content server 302.

Steps 730 to 738 show an example where requests made for content by a following client are passed onto the content server using HTTP HEAD requests, which allows the content server to track content requests without responding with the actual content. So, step 730 shows a HTTP GET request sent to proxy Y 308*a* for content (previously cached), with Proxy Y 308*a* responding with a HTTP response with requested content from its cache.

However, Proxy Y 308*a* additionally sends the received HTTP GET request onto Proxy X in step 734. In response to the HTTP GET request, Proxy X 306 sends an HTTP HEAD request to the content server 302 in step 736. The HTTP HEAD request causes the content server 302 to return the header of the response, but not the payload in step 738 (so the content requested in the original HTTP GET request is not included in the response).

Note, Proxy X can in step 708 send the response over multicast to other Proxy Ys (308*b* and 308*c* for example) that are members of the same established cohort. These other Proxy Ys can cache this content, and provide it to any client devices making requests for that content from those Proxy Ys.

In the approaches described above, it is not possible to send responses that are different for different client devices as the multicast path is used to deliver identical content to all client devices.

In a second approach of multicast assisted unicast delivery described here, this is overcome by separating the (unicast) responses to the HTTP GET requests into two components: one component containing all elements that may be different for different members of the cohort (typically the header from the response); and a second component containing elements that are common to all members of the cohort (typically the payload containing the content being requested). The common components are delivered over multicast and the individual components are delivered over unicast using the arrangement described above.

Therefore, the initial HTTP unicast request from the client device is forwarded to the content server via the associated Proxy Y and the Proxy X. However, the unicast response from the content server is split into the two components by Proxy X before being sent on: the different component being sent over unicast to the Proxy Y associated with the requesting client device, and the common component being sent over multicast to all Proxy Ys in the cohort. Re-assembly of the two components is handled by the associated Proxy Y, with the re-assembled response being sent over unicast to the client device.

The re-assembled response sent to the client device is identical to that which would have been provided to the client device had Proxy Y directly forwarded the initial unicast request to the content server and received the response over unicast directly from the content server. This is an important feature of the current approach, as all of the session information between the client device and the content server to be preserved. It thus removes the need for Proxy X to behave as a client device in its own right (providing its own authentication etc.), since Proxy X forwards requests from client devices with their own credentials intact, which may include authentication credentials. In many cases of practical interest, all session-specific information is contained in HTTP headers, whereas the response payloads may be shared by many endpoints.

Whilst the example below describes a method where the common component is in the payload of the initial response, with the different elements in the header, a person skilled in the art will appreciate that the same method can apply to other decompositions of the response which do not align with a perfect header/payload split.

Returning to FIG. 6, after the process described here, Proxy X 306 and Proxy Y 308*a* (and other Proxy Ys in the cohort) are enabled to deliver HTTP responses using multicast assisted unicast delivery. The first member of the cohort to next make a given request for content will trigger the use of multicast assistance to deliver the payload of the response over multicast from Proxy X 306 to all Proxys Y that are members of the relevant cohort, and the header of the response over unicast from Proxy X 306 to Proxy Y 308*a* associated with the requesting client device 304*a*. When a Proxy Y receives the payload, it stores it in an internal cache ready for processing.

It should be noted that there could be variations on the sequence described above. For example, the controller could instruct the Proxy X to use multicast before it instructs any Proxy Ys to join the cohort. The logical result will still be the same, although the loading on different components during the transition from unicast to multicast assisted delivery may be different.

A discussion now follows on how a response from the content server 302 may be separated by Proxy X 306 into the two components and delivered over two separate delivery paths to Proxy Ys for re-assembly.

In this example, Proxy X generates a client-specific component that contains the header portion of the original response from the content server, but does not include the payload from the original response, and further includes the following modifications to the header fields:

The 'Content-Length' attribute is set to zero to indicate that there is no payload;

An additional attribute (X-Content-Length) used to indicate the value of the original 'Content-Length' attribute; and An additional attribute (X-Content-Id) used as a content identifier to identify the associated payload.

Proxy X also generates a corresponding common component that contains the payload from the original response from the content server. The same content identifier (X-Content-Id) that is used in the client-specific component is also included with the common component before it is sent over multicast to Proxy Y. As the common component does not contain an HTTP header, the content identifier needs to be attached to the common component, which can be done for example using a suitable framing type such as QUIC, FLUTE, ROUTE, etc. In the following example, QUIC has been used.

Figure 11:
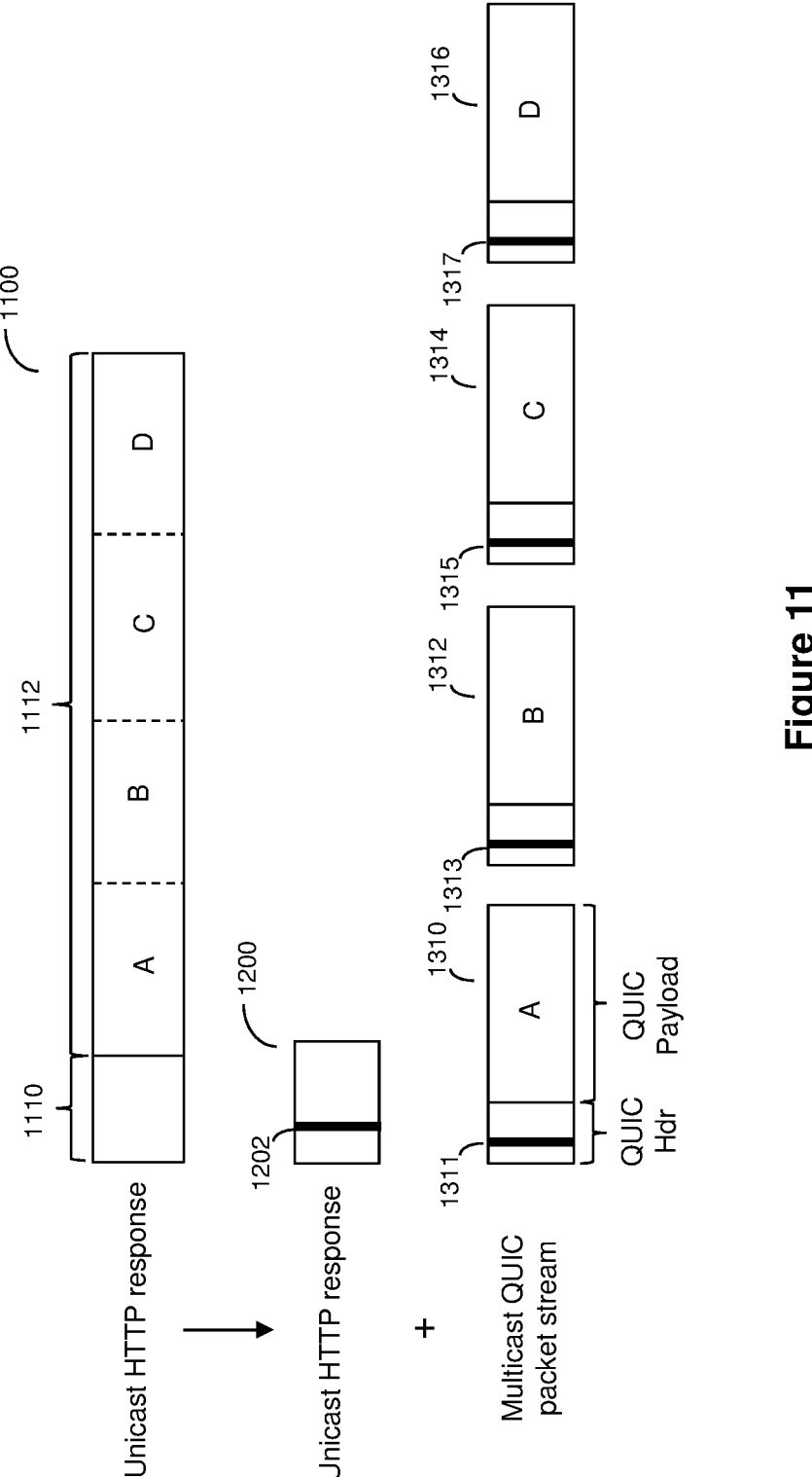
FIG. 11 illustrates the format of a response from the content server, and the resulting packet carrying the modified header and stream of QUIC packets carrying the payload in an example of the invention.

FIG. 11 shows an example of the formats of an HTTP response 1100, and the resulting HTTP packet 1200 carrying the modified header from the HTTP response, and the resulting stream of QUIC packets carrying the payload.

The HTTP response 1100 comprises a header portion 1110 (the client specific component) and a payload portion 1112 (the common component).

The HTTP response 1200 that is generated comprises the header 1110 from the HTTP response 1000, but modified as described earlier. This modified header includes the content identifier "X-Content-Id" marked here as 1202. This HTTP response will be sent by Proxy X over unicast to Proxy Y.

The QUIC packet stream comprises 4 QUIC packets 1310, 1312, 1314 and 1316. Each of the QUIC packets includes a QUIC header and a QUIC payload. The payload 1112 is carried in the QUIC packet payloads. However, as HTTP payloads are typically much larger than QUIC pay-loads, the HTTP payload 1112 is split into fragments A, B, C and D, and carried in respective QUIC packets 1310, 1312, 1314, and 1316. Each of the QUIC headers also include a content identifier "X-Content-Id" 1311, 1313, 1315, and 1317. "X-Content-Id" in the QUIC headers have the same value as the "X-Content-ID" 1102 in the modified header of the HTTP packet. A FIN bit in the final QUIC packet header is set to denote the end of the QUIC sequence of packets. Any further HTTP responses will have a corre-sponding stream of QUIC packets carrying the payload, but with a new content identifier.

The QUIC packets are carried over multicast UDP and sent to Proxy Y. Proxy Y receives the QUIC packets uses the "X-Content-Id" attribute to identify the QUIC payloads (A, B, C, and D) that need to be recombined to generate the original HTTP response payload. Once regenerated, the payload is stored in a cache in Proxy Y using the X-Content-ID as a key for use later.

The use of the same content identifier for the unicast and multicast packets allows the client-specific component to be linked to and later re-combined with the corresponding common component. The content identifier can be generated by Proxy X and uniquely identifies the payload. A more detailed discussion of the generation of content identifier follows later.

The client-specific component is sent over unicast from Proxy X to the relevant Proxy Y 308a associated with the requesting client device 304a. The common component is sent from Proxy X over multicast to (or subscribed to by) all Proxy Ys in the relevant cohort.

Now, when Proxy Y 308a receives the unicast response to the HTTP request, it will identify it as requiring additional processing because of the presence of the X-Content-Id attribute. To generate a response that can be forwarded to the client device 304a, Proxy Y 308a reverses the modification to the header made at Proxy X. Specifically, Proxy Y will restore the Content-Length field to its original value by using the value held in the X-Content-Length field, and remove the two additional attributes. The X-Content-Id is used as a retrieval key to identify the correct payload from those previously stored in the cache, where each of the payloads stored in the cache are indexed by the X-Content-Id attribute. The identified payload is then re-combined with the restored header to generate an exact copy of the original response that was sent by the content server 302 to Proxy X 306.

This response can then be sent over unicast to the client device 304a.

Figure 8:
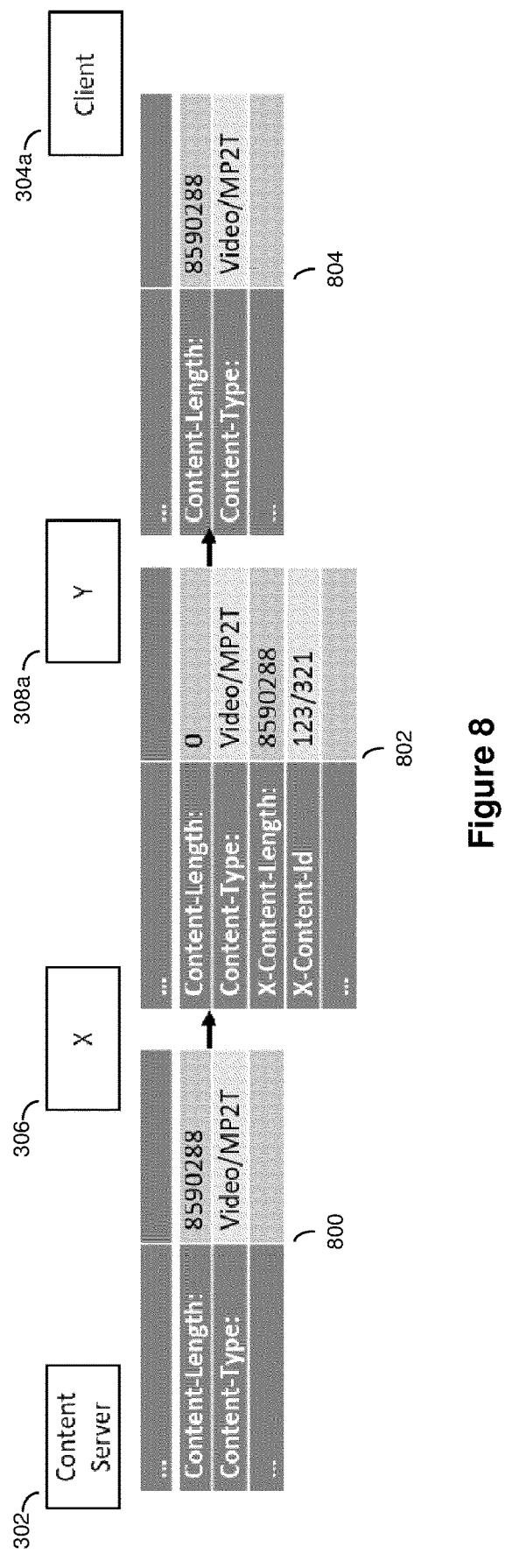
FIG. 8 shows examples of how the header is modified in responses in an example of the present invention.

FIG. 8 shows an example of how the header is modified in responses sent from the content server 302 to the client device 304a, by way of Proxy X 306 and Proxy y 308a, with the unmodified fields omitted for clarity. The response 800 is from the content server 302 to Proxy X 306, with a Content-Length field set to "8590288", and a Content-Type field set to "Video/MP2T".

Here it is assumed that Proxy X 306 has been previously set-up (see FIG. 6) to use multicast assistance for all content of type "Video/MP2T". Thus, when Proxy X 306 receives the response 800 over unicast, it creates a new response 802 by adding a further header field X-Content-Length and copies the length from the original Content-Length field into X-Content-Length, and then sets the value of Content-Length to zero. Proxy X also adds a header field X-Content-Id to response 802 and sets its value to the content identifier that is being used for the payload, here "123/321". The new response 802 is sent over unicast to Proxy Y 308a. Whilst the payload that is being sent separately over multicast is not shown in FIG. 7, it should be noted that it will have been allocated the same X-Content-Id value "123/321" used in response 802.

At Proxy Y 308a, the response 802 is re-assembled with the payload, using X-Content-Id as the key to correctly link the corresponding components. Once re-assembly is com-plete, the changes to the HTTP response header are reversed. Thus, a response comprising a header 804 and a payload carrying the requested content is served by Proxy Y to the client device 304a over unicast, with the header 804 being identical to the original header 800.

The first request from a client device for a given piece of content that triggers the use of multicast assistance is treated differently from subsequent requests for the same content from other client devices. This is because subsequent requests should not cause Proxy X to re-transmit an identical response payload over multicast, having already transmitted the payload in response to the first request, during the lifetime of the cohort. Note that the same piece of content could be transmitted multiple times by the Proxy X, but only once to each cohort instance.

Furthermore, if the response payload for a given piece of content has already been sent over multicast to the cohort, then Proxy X should ideally not make further requests for that content from the content server, since it will only be discarded by Proxy X. Alternatively, Proxy X could make a HTTP HEAD request so that session-specific header infor-mation can be received—see step 904 below.

The method used to determine whether a response pay-load has already been sent over multicast is to maintain a history of request/response records, each record containing a subset of data from each request and the corresponding response. One such history will be associated with each cohort.

Each record in the history would include the URL of the request and a content identifier, which uniquely identifies the payload of the response. The content identifier could be X-Content-Id, which is used to link the header and payload components and shown in FIG. 8. Proxy X is responsible for generating the content identifier, for example from the Proxy Y request or the content server's response, and allocating it to the client specific and common components.

Conveniently, if the content server provides one, the content identifier could simply be the "Entity Tag" (Etag) value, which are used to identify response payloads uniquely. If they are present, they are included in the header of an HTTP response.

Figure 9:
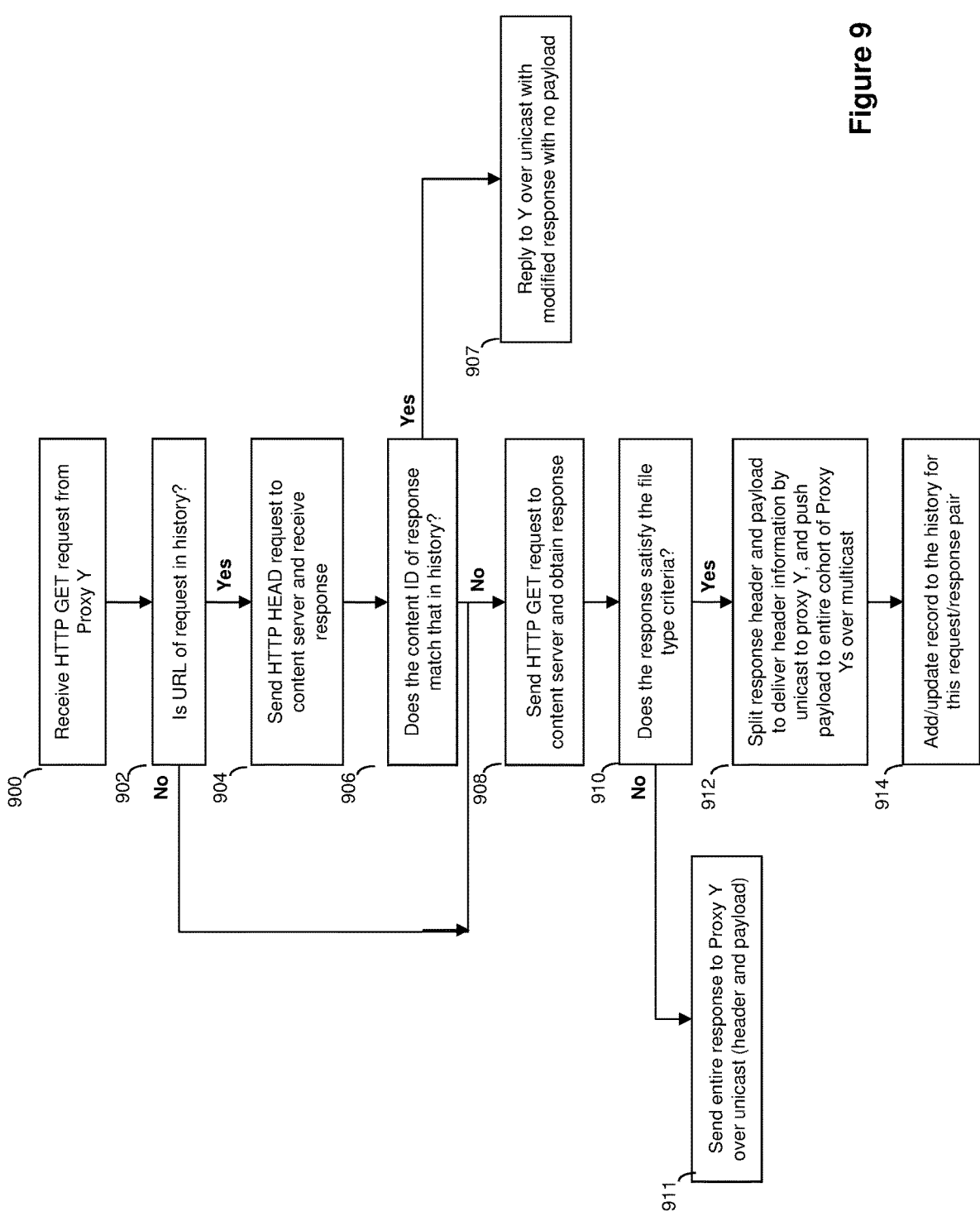
FIG. 9 is a flow chart showing the processing for one of the proxies in an example of the present invention.

FIG. 9 is a flow chart showing the logic for Proxy X 306 responding to a HTTP GET request for content from Proxy Y 308a.

In step 900, Proxy X 306 receives a HTTP GET request from Proxy Y 308a for a piece of content specified by a URL.

In step 902, Proxy X consults the history for the cohort Proxy Y 308a is associated with. If the URL used in the request is not present in the history, then processing passes to step 808 where Proxy X forwards the HTTP GET request received from Proxy Y 308a to the content server.

If, on the other hand, the URL used in the request is present in the history for the appropriate cohort, then processing passes to step 904, where Proxy X 306 sends an HTTP HEAD request to the content server. The HTTP HEAD request will cause the content server to return the header of the response, but not the payload (so the content requested in the original HTTP GET request is not included in the response).

In step 906, Proxy X 306 will generate a content identifier (for example, using any Etag in the header of the response) associated with the response and compare the generated content identifier with that stored the history corresponding to the URL of the request. If there is a match, processing passes to step 807, where Proxy X will return a modified response to Proxy Y 308a with a zero-length payload and will not push the content payload over multicast as it has already been sent according to the history.

If the generated content identifier for this request does not match that in the history record, then processing passes to step 908, where Proxy X sends an HTTP GET request to the content server in order to obtain the payload. This is the same request as was received from Proxy Y 308a in step 900. The response received is a unicast HTTP response, comprising a header and a payload.

In step 910, Proxy X checks to see if the response received from the content server satisfies the file type criteria, as set out in step 702. For example, the file/MIME type criteria could be "video/MP2T", and thus if the response does contain a "video/MP2T" MIME type payload, then processing passes to step 912. Otherwise if the response does not contain a "video/MP2T" MIME type payload, then processing passes to step 911.

So in step 911, the entire HTTP response (header and payload) is sent over unicast to Proxy Y 308a, and processing is complete.

Whereas in step 912, the HTTP response is split into a client-specific component (the header) and a common component (the payload). Both the header and payloads are allocated a suitable content identifier as described earlier. The header is also modified as described earlier (see above where header 800 is modified to header 802), before it is sent over unicast to Proxy Y 308a. Whereas the payload is pushed over multicast to the entire cohort that includes Proxy Y 308a.

Processing passes from step 912 to step 914.

In step 914, the history record for the request/response pair is added/updated at Proxy X.

Note that in some cases, content servers won't provide Etag values and may not accept HTTP HEAD requests. In such cases, the URL of the requested content could be used instead, although this would cause problems if the same URL is used to refer to changing content, as could happen for example with an HTTP Live Streaming (HLS) manifest. Alternatively, a less efficient, but more reliable approach, would be for Proxy X to always send and HTTP GET requests to the content server (and not use HTTP HEAD requests), and derive its own content identifier (e.g. a hash value) from the returned payload.

Figure 10:
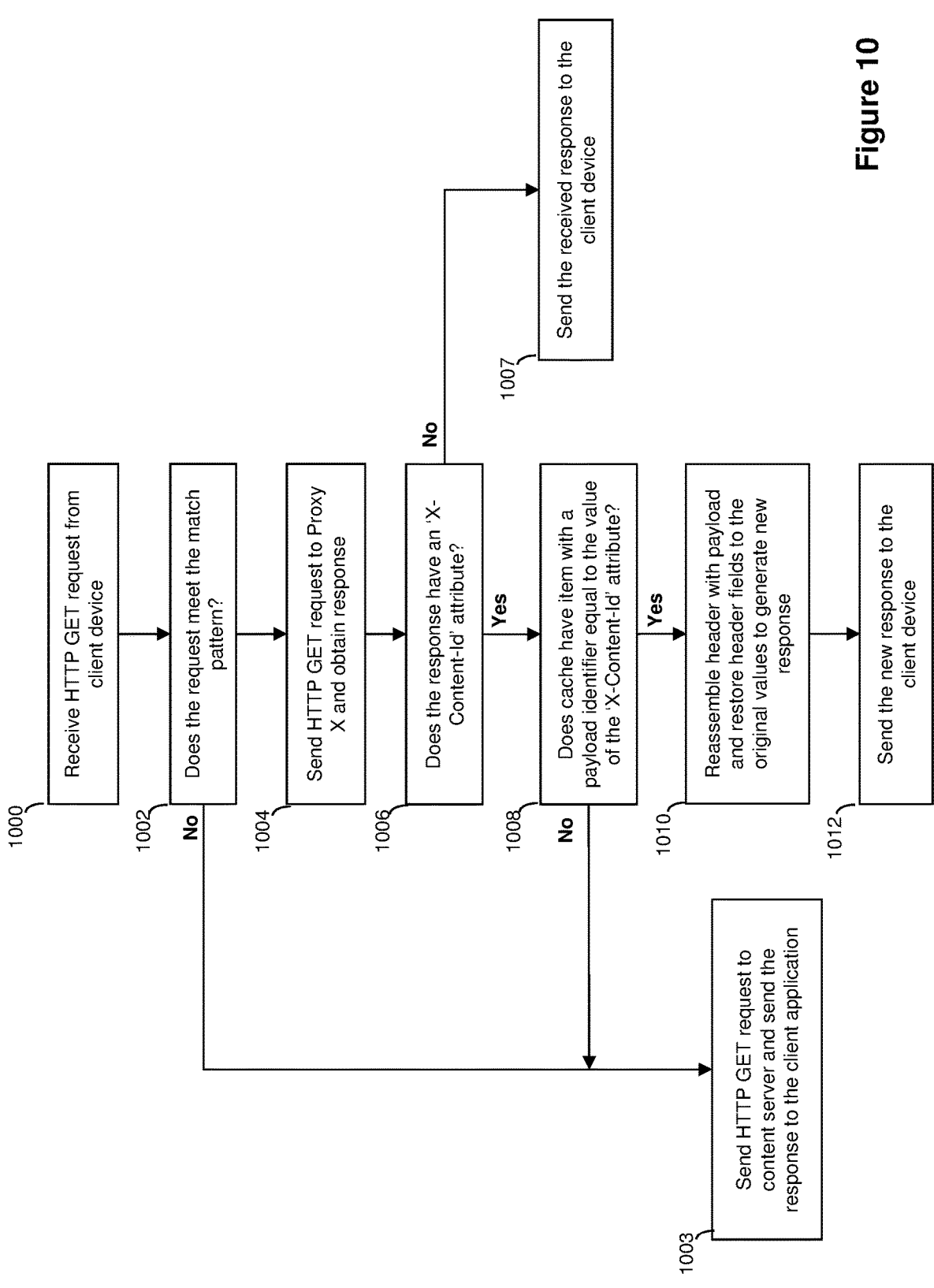
FIG. 10 is a flow chart showing the processing for one of the proxies in an example of the present invention.

FIG. 10 is a flow chart showing the processing for Proxy Y 308a receiving a HTTP GET request from the client device and how it uses cached payloads to help generate responses.

In step 1000, a HTTP GET request for a piece of content is received by Proxy Y 308a from a client device over unicast.

In step 1002, a check is made by Proxy Y 308a to determine if the request meets the predetermined match pattern. As described above in relation to step 502, requests that contain the match pattern are to be processed with multicast assistance, and thus forwarded to Proxy X in step 1004.

However, if the request does not contain the match pattern, then processing continues without attempting multicast assistance and passes to step 1003. In step 1003, the received HTTP GET request is sent directly to the content server over unicast. The response from the content server is also sent over unicast, and after receiving it, Proxy Y 308a sends it to the client device over unicast.

In contrast, in step 1004, the HTTP GET request is sent by Proxy 308a to Proxy X 306, and a response obtained. Then in step 1006 Proxy Y 308a checks to see if the response contains the "X-Content-Id" attribute, which indicates the response received is subject to multicast assistance with the client-specific component delivered in this response and the common component delivered separately.

If the response does not contain the "X-Content-Id" attribute, then the response has not been subject to multicast assistance (and therefore the response has not been split into client-specific and common components), and so the entire response is sent directly to the client device over unicast.

However, if the response does contain the "X-Content-Id" attribute (the header will now resemble for example 802), then processing passes to step 1008, where a check is made to determine if Proxy Y 308a has already received a corresponding common component identified by a content identifier equal to "X-Content-Id" from the response. Proxy Y 308a does so by checking its cache, which is where common components are stored with the content identifier as the key. If there is not a cache item with the same "X-Content-Id", then processing passes to step 1003, where the received HTTP GET request is sent directly to the content server over unicast. The response from the content server is also sent over unicast, and after receiving it, Proxy Y 308a sends it to the client device over unicast.

If there is a cache item with the same "X-Content-Id", then processing passes to step 1010, where the response header is re-assembled with the payload, using X-Content-Id as the key to link the corresponding header and payload components. The changes made (in step 912 by Proxy X) to the HTTP response header are also reversed. Thus, a new response comprising a header (see 804) and a payload carrying the requested content is generated by Proxy Y, and in step 1012 this new response is sent to the client device 304a over unicast.

This new response will appear to the client device 304a to be identical to that sent by the content server 304 to Proxy X, even though the path taken by the response is split over unicast and multicast for the respective client specific and common components.

Note, the term "unicast" used in the described examples is intended to cover point-to-point communications services in general. Similarly, the term "multicast" is intended to cover point-to-multipoint services, including broadcast services.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of delivering content to a client device in a network comprising a plurality of client devices, said method comprising:

i) receiving at a first network node a request for content from one of the client devices over unicast, and sending that request to a second network node over unicast;

ii) receiving the request for content at the second network node from the first network node, and then sending a corresponding request onto a content server over unicast;

iii) receiving the content that has been requested by the request for content at the second network node from the content server over unicast, and in response sending the content that has been received by the second network node to the first network node over multicast; and iv) receiving the content from the second network node at the first network node, and sending the content to the client device, that sent the request for content received at the first network node, over unicast.

2. A method according to claim 1, wherein the request from one of the client devices is a HTTP GET request.

3. A method according to claim 1, wherein the corresponding request is a HTTP GET request.

4. A method according to claim 1, wherein the corresponding request is a HTTP HEAD request.

5. A method according to claim 1, wherein the content received at the second network node is cached.

6. A method according to claim 5, wherein the cached content is provided to other client devices requesting that content.

7. A method according to claim 1, wherein the requested content received at the second network node is reformatted and pushed over multicast to the first network node.

8. A method according to claim 1, wherein the content is media content.

9. A method according to claim 8, wherein the media content comprises a video sequence.

10. A method according to claim 1, wherein the first and second network nodes are proxy servers.

11. A system for delivering content to a client device in a network comprising a plurality of client devices, said system comprising a first network node and a second network node, wherein the first network node is adapted to receive a request for content from one of the client devices over unicast, and to send that request to the second network node over unicast;

the second network node is adapted to receive the request for content from the first network node, and to then send a corresponding request onto a content server over unicast;

the second network node is further adapted to receive the content that has been requested by the request for content at the second network node from the content server over unicast, and in response to send the content that has been received by the second network node to the first network node over multicast; and the first network node is further adapted to receive the content from the second network node, and to send the content to the client device, that sent the request for content received by the first network node, over unicast.

12. The system according to claim 11, wherein the first network node is configured to send a consumption report including information on a uniform resource locator (URL) of a HTTP request.

13. The system according to claim 11, wherein the first network node and the second network node are configured for multicast assisted delivery when a certain number of client devices request a same content.

14. The system according to claim 11, wherein the first network node is configured to receive a matching pattern, and redirect any URL request at least partially matching the matching pattern to the second network node.

15. The system according to claim 11, wherein both unicast and multicast paths are established between the first network node and the second network node, but only unicast paths are established between the client device and the first network node, and only unicast paths are established between the second network node and the content server.

16. The method according to claim 1, wherein the first network node sends a consumption report including information on a uniform resource locator (URL) of a HTTP request.

17. The method according to claim 1, further comprising configuring the first network node and the second network node for multicast assisted delivery when a certain number of client devices request a same content.

18. The method according to claim 1, wherein the first network node receives a matching pattern, and redirects any URL request at least partially matching the matching pattern to the second network node.

19. The method according to claim 1, wherein both unicast and multicast paths are established between the first network node and the second network node, but only unicast paths are established between the client device and the first network node, and only unicast paths are established between the second network node and the content server.

20. The system according to claim 11, wherein the first and second network nodes are proxy servers.

* * * * *